(12) United States Patent
Katagiri et al.

(10) Patent No.: US 11,309,112 B2
(45) Date of Patent: Apr. 19, 2022

(54) SOLENOID VALVE DRIVE DEVICE

(71) Applicant: Hitachi Automotive Systems, Ltd., Hitachinaka (JP)

(72) Inventors: Takuya Katagiri, Hitachinaka (JP); Takao Fukuda, Hitachinaka (JP); Yuuji Ishida, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 16/973,271

(22) PCT Filed: Jun. 11, 2019

(86) PCT No.: PCT/JP2019/023015
§ 371 (c)(1),
(2) Date: Dec. 8, 2020

(87) PCT Pub. No.: WO2020/008815
PCT Pub. Date: Jan. 9, 2020

(65) Prior Publication Data
US 2021/0249170 A1   Aug. 12, 2021

(30) Foreign Application Priority Data

Jul. 3, 2018  (JP) .............................. JP2018-126579

(51) Int. Cl.
*H01F 7/06*  (2006.01)
*F16K 31/06*  (2006.01)

(52) U.S. Cl.
CPC ......... *H01F 7/064* (2013.01); *F16K 31/0675* (2013.01)

(58) Field of Classification Search
CPC ...... F16K 31/02; F16K 31/06; F16K 31/0644; F16K 31/0675; F02D 2041/2003; F02D 2041/2055; F02D 2041/2058; F02D 41/20; F02M 51/06; H01F 7/064
See application file for complete search history.

(56) References Cited

U.S. PATENT DOCUMENTS

| 6,571,773 B1 | 6/2003 | Yamakado |
| 8,018,216 B2 * | 9/2011 | Kakehi ................... F02D 41/20 323/288 |
| 10,087,870 B2 * | 10/2018 | Imai ........................ F02D 41/20 |

FOREIGN PATENT DOCUMENTS

| JP | 2001-041085 A | 2/2001 |
| JP | 2013-258406 A | 12/2013 |
| JP | 2014-169652 A | 9/2014 |
| JP | 2014169652 A * | 9/2014 |

OTHER PUBLICATIONS

International Search Report with English translation and Written Opinion issued in corresponding application No. PCT/JP2019/023015 dated Sep. 17, 2019.

* cited by examiner

*Primary Examiner* — Matthew W Jellett
(74) *Attorney, Agent, or Firm* — Foley & Lardner LLP

(57) ABSTRACT

Provided is a solenoid valve drive device capable of accurately controlling a hysteresis value of a drive current for driving a solenoid valve. The solenoid valve drive device according to the present invention controls a set value of a hysteresis or a time width of the hysteresis based on a difference between an extreme value of the hysteresis in a peak hold period of a drive current and a set value of the extreme value.

10 Claims, 8 Drawing Sheets

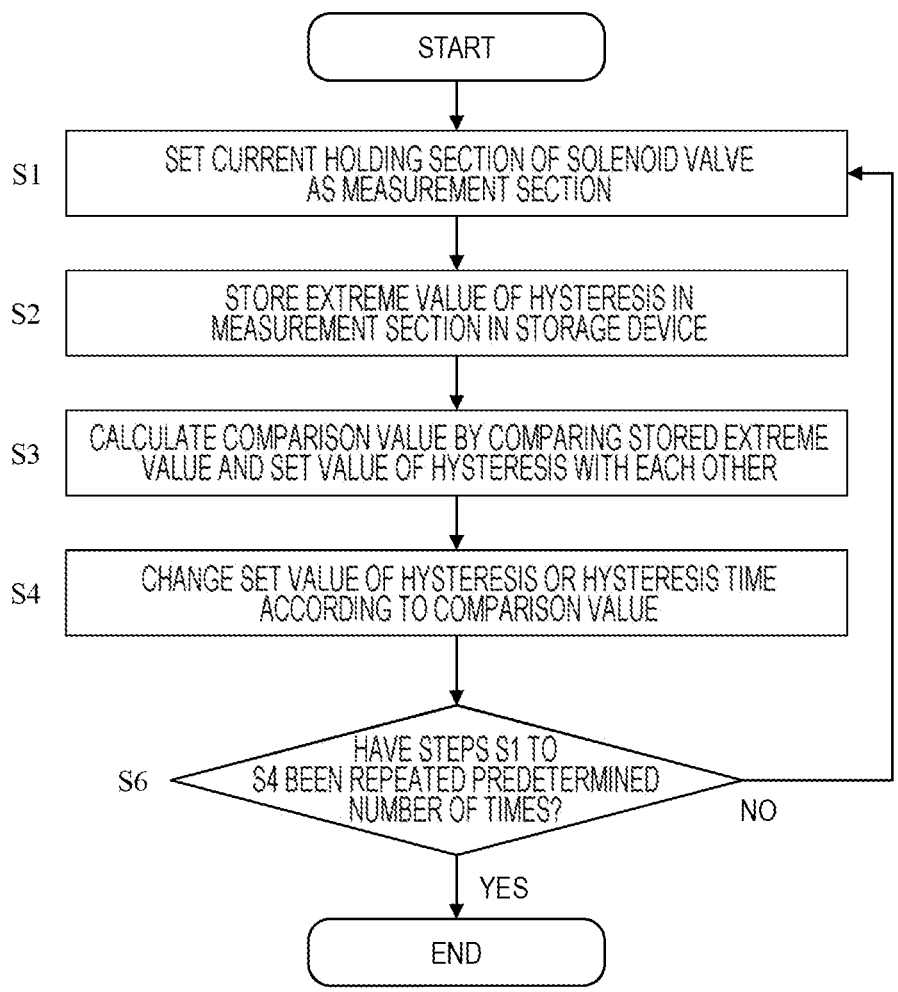

SOLENOID VALVE DRIVE DEVICE

TECHNICAL FIELD

The present invention relates to a solenoid valve drive device that controls a current flowing through a solenoid valve to open and close the solenoid valve.

BACKGROUND ART

A solenoid valve that injects fuel into each cylinder of an internal combustion engine includes a solenoid valve opened and closed by energization and de-energization of a solenoid. A solenoid valve drive device that drives the solenoid valve generally includes a first switch means that boosts a battery voltage and applies the boosted battery voltage to the solenoid valve, a second switch means that applies the battery voltage to the solenoid valve according to an injection signal, and a third switch means that is in an energized state in an entire region of an injection period of the solenoid valve.

The solenoid valve drive device applies a boosted voltage to the solenoid valve in synchronization with the injection signal in order to quickly open the solenoid valve. In addition, even in high-pressure fuel, a constant current is allowed to flow through the solenoid valve for a predetermined time in order to reduce a variation in opening the solenoid valve. Thereafter, in order to maintain the solenoid valve in a predetermined opened state, switching is performed so as to cut off the boosted voltage and apply the battery voltage. Thereafter, the constant current is allowed to flow through the solenoid valve by the battery voltage until a drive period ends. A constant current control unit allowing the constant current to flow through the solenoid valve executes hysteresis control in which a switching element is turned on when a current value becomes equal to or lower than a lower limit threshold and the switching element is turned off when the current value becomes equal to or higher than an upper limit threshold.

A solenoid valve drive device described in PTL 1 measures a maximum value and a minimum value in constant current control of a solenoid valve, and adjusts an upper limit setting value and a lower limit setting value of a constant current so that a difference between the maximum value and the minimum value falls within a standard range.

CITATION LIST

Patent Literature

PTL 1: JP 2014-169652 A

SUMMARY OF INVENTION

Technical Problem

In the solenoid valve drive device, there is an operation delay in an electronic component that constitutes the constant current control of the solenoid valve, and thus, a delay time occurs from after the current reaches an upper or lower limit threshold until turn-on/off of the switching element is switched. Therefore, even though the current reaches the upper or lower limit threshold, the current may continue to change toward the same direction to exceed the threshold. A threshold excess amount can be said to be an error between an actual extreme value and the threshold of the solenoid valve current. Further, a variation in the threshold excess amount may also occur due to a variation in a coil resistance of the electronic component or the solenoid valve that constitutes the constant current control.

In addition, in order to cope with exhaust gas regulations and fuel consumption reduction, an increase in a pressure of the solenoid valve has been developed in recent years. Therefore, the current is held for a predetermined time using the boosted voltage for opening the valve so that the valve can be stably opened even under a high voltage. At this time, the current is controlled by the boosted voltage, and a deviation of the threshold excess amount thus tends to increase. Therefore, it has been required to control a hysteresis value of the solenoid valve current of the solenoid valve drive device with higher accuracy than in a conventional manner.

In a technology described in PTL 1, in order to suppress a variation in a hysteresis caused by electrical characteristics of a coil current path, the electrical characteristics are measured, and upper and lower thresholds corresponding to the measured values are then acquired from a threshold map created in advance. This method is for suppressing the variation in the hysteresis caused by the electrical characteristics of the coil current path, and it is considered that it is difficult to deal with a variation in a hysteresis caused by other factors.

The present invention has been made in view of the above circumstance, and an object of the present invention is to provide a solenoid valve drive device capable of accurately controlling a hysteresis value of a drive current for driving a solenoid valve.

Solution to Problem

A solenoid valve drive device according to the present invention controls a set value of a hysteresis or a time width of the hysteresis based on a difference between an extreme value of the hysteresis in a peak hold period of a drive current and a set value of the extreme value.

Advantageous Effects of Invention

According to the solenoid valve drive device of the present invention, the set value of the hysteresis or the time width of the hysteresis is controlled according to how much a hysteresis value of the drive current for driving a solenoid valve deviates from the set value, and the hysteresis can thus be accurately controlled.

BRIEF DESCRIPTION OF DRAWINGS

FIG. 6 is a flowchart illustrating another procedure in which a solenoid valve drive device 18 inhibits a hysteresis of the drive current I1 from exceeding a threshold.

DESCRIPTION OF EMBODIMENTS

First Embodiment: Configuration of Device

Figure 1:
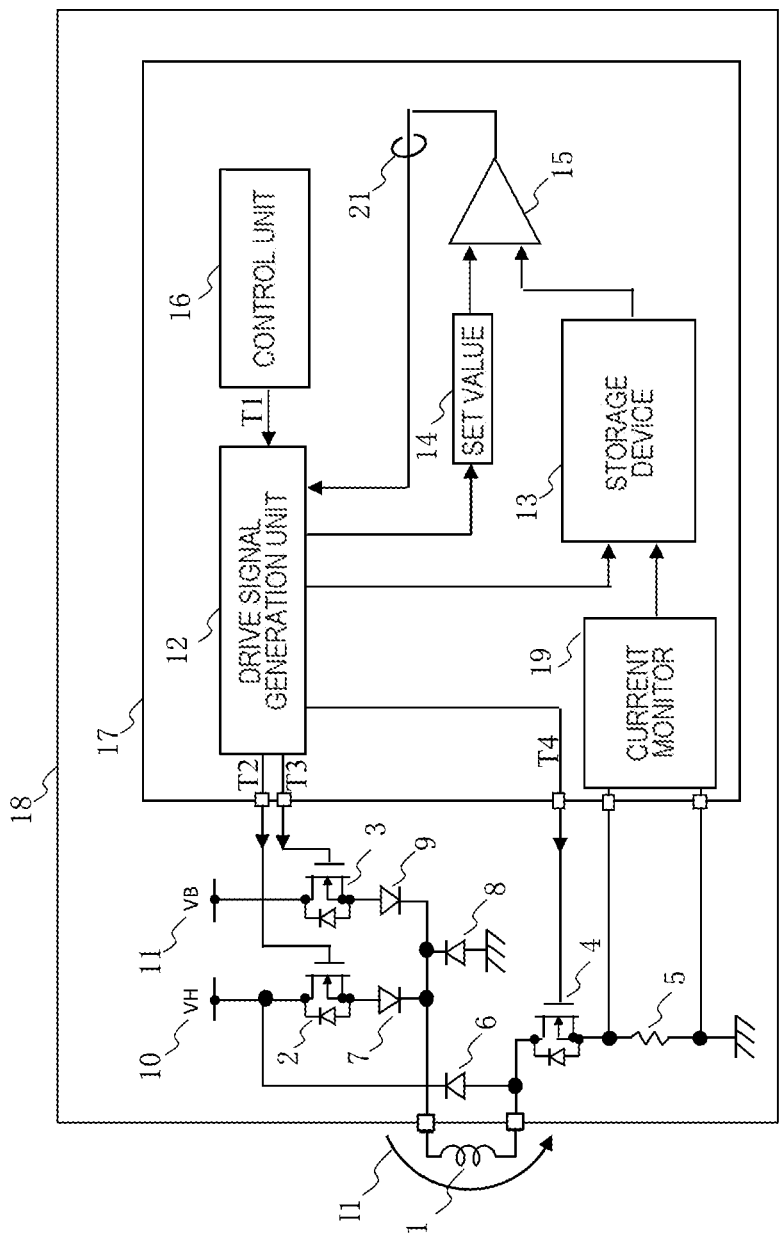
FIG. 1 is a configuration diagram of a solenoid valve drive device 18 according to a first embodiment.

FIG. 1 is a configuration diagram of a solenoid valve drive device 18 according to a first embodiment of the present invention.

The solenoid valve drive device 18 controls fuel injection into each cylinder included in an engine or a diesel engine by driving a solenoid valve 1. The solenoid valve drive device 18 controls a fuel injection timing and a fuel injection amount into each cylinder by controlling an energization start timing and an energization time of the solenoid valve 1. For example, in a case of a four-cylinder engine, fuel injection of solenoid valves included in each of four cylinders is controlled. The solenoid valve 1 is a normally-closed solenoid valve, and when the solenoid valve 1 is energized, a valve body (not illustrated) moves to a valve opening position, such that fuel is injected, and when the energization of the solenoid valve 1 is cut off, the valve body returns to an original valve closing position, such that the fuel injection is stopped.

The solenoid valve drive device 18 includes a first switching element 2, a second switching element 3, a third switching element 4, a current detection resistor 5, a free wheeling diode 6, protection diodes 7 to 9, batteries 10 and 11, and a system unit 17. The system unit 17 further includes a drive signal generation unit 12, a storage device 13, a comparator 15, and a control unit 16. The battery 10 may be, for example, a voltage obtained by boosting a voltage supplied by the battery 11. A set value 14 is a comparison reference value used by the comparator 15, and is stored in the storage device 13.

The first switching element 2 applies a voltage supplied by the battery 10 to the solenoid valve 1. The second switching element 3 applies a voltage supplied by the battery 11 to the solenoid valve 1. The third switching element 4 is in the energized state in an entire region of an injection period. These switching elements can be configured by, for example, a metal oxide semiconductor (MOS) transistor.

The control unit 16 outputs a drive signal T1 for driving the solenoid valve 1 to the drive signal generation unit 12. The drive signal T1 has an H level during a period for commanding the solenoid valve 1 to be opened (hereinafter, referred to as a drive period), and has an L level for a period for commanding the solenoid valve 1 to be closed (hereinafter, referred to as a non-drive period). In a case where there are a plurality of solenoid valves 1, the control unit 16 selects a solenoid valve 1 to be energized and then outputs the drive signal T1 to the selected solenoid valve 1. The control unit 16 can be configured by, for example, a microcomputer. The drive signal generation unit 12 outputs drive signals to the first switching element 2, the second switching element 3, and the third switching element 4 based on the drive signal T1 from the control unit 16. Hereinafter, each of a valve opening section (second peak hold period), a valve opening maintaining section (first peak hold period), and a valve closing section of the solenoid valve 1 will be described.

In the valve opening section, a peak current is supplied to the solenoid valve 1 in order to quickly open the solenoid valve 1 at the time of starting a set drive period. The control unit 16 outputs the drive signal T1 to the drive signal generation unit 12 in order to drive the solenoid valve 1 for only a predetermined period. The drive signal generation unit 12 supplies the peak current to the solenoid valve 1, and thus outputs a drive signal T2 to the first switching element 2. The first switching element 2 is controlled to be turned on/off according to the drive signal T2. At this time, the third switching element 4 is turned on according to a drive signal T4 output from the drive signal generation unit 12.

The solenoid valve drive device 18 transitions to the valve opening maintaining section after the valve opening section. In the valve opening maintaining section, the voltage supplied by the battery 11 is applied to the solenoid valve 1 in order to hold the solenoid valve 1 in a valve opening position. The drive signal generation unit 12 turns off the drive signal T2, and outputs a drive signal T3 to the second switching element 3 in order to supply a valve open maintaining current to the solenoid valve 1, in the valve open maintaining section. The second switching element 3 is controlled to be turned on/off according to the drive signal T3. At this time, the third switching element 4 is turned on according to the drive signal T4.

When a valve closing timing in the valve closing section is reached, the control unit 16 turns off the drive signal T1. When the drive signal T1 is turned off, the drive signal generation unit 12 turns off the drive signals T3 and T4 accordingly. As a result, counter electromotive energy accumulated in the solenoid valve 1 is discharged.

Figure 2:
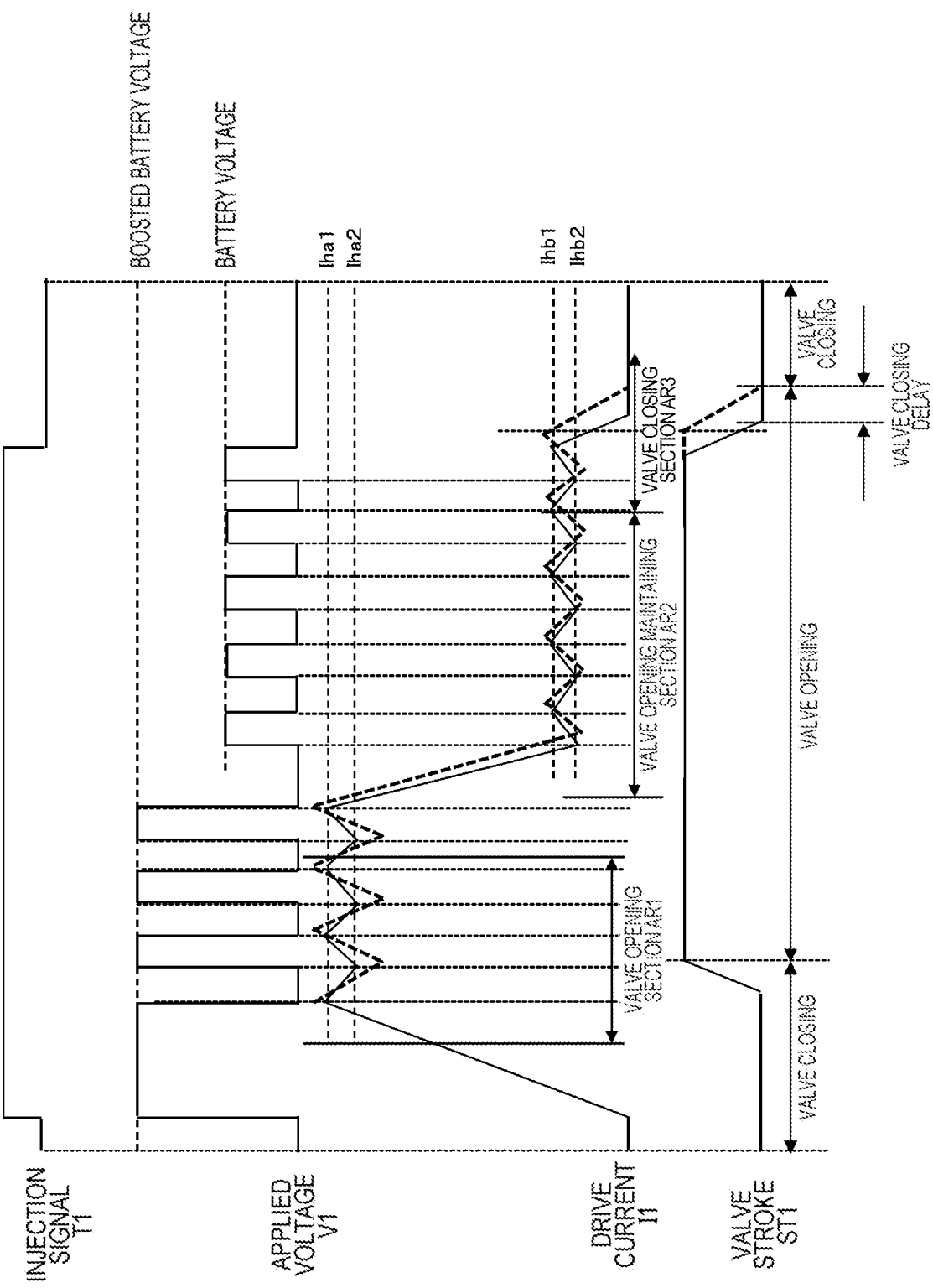
FIG. 2 is a time chart for describing turn-on/off operations of each switching element.

FIG. 2 is a time chart for describing turn-on/off operations of each switching element. First, an operation of the first switching element 2 in a valve opening section AR1 will be described. The turn-on/off control of the first switching element 2 is for holding a drive current I1 of the solenoid valve 1 in the vicinity of the peak level (constant current control). When the drive signal T1 is turned on, the first switching element 2 is turned on, such that an applied voltage V1 is applied to the solenoid valve 1. When the applied voltage V1 is applied to the solenoid valve 1, the drive current I1 gradually increases due to a coil resistance of the solenoid valve 1. When the drive current I1 reaches an upper limit threshold Tha1, the first switching element 2 is turned off, such that the drive current I1 decreases. When the drive current I1 reaches a lower limit threshold Iha2, the first switching element 2 is turned on again. In this way, a swing width (hysteresis) of the drive current I1 is held between the lower limit threshold Iha2 and the upper limit threshold Iha1 in the valve opening section AR1. As a result, a valve opening force of the solenoid valve 1 increases, such that the solenoid valve 1 is smoothly opened even under a high fuel pressure, for example.

Next, an operation of the second switching element 3 in a valve opening maintaining section AR2 will be described. When the constant current control in the valve opening section AR1 ends, the first switching element 2 and the second switching element 3 are turned off, such that the drive current I1 decreases. When the drive current I1 decreases up to a lower limit threshold Ihb2 in the valve opening maintaining section AR2, the second switching element 3 is turned on, such that the drive current I1 rises again.

When the drive current I1 reaches an upper limit threshold Ibl, the second switching element 3 is turned off. In this way, a swing width (hysteresis) of the drive current I1 is held between the lower limit threshold Ihab and the upper limit threshold Ihb1 in the valve opening maintaining section AR2. As a result, the solenoid valve 1 is held in the valve opening position.

Due to a variation in characteristics of the solenoid valve drive device 18 (for example, operating characteristics of each switching element), a variation in the coil resistance of the solenoid valve 1, or the like, a change in the drive current I1 may be delayed with respect to the operation of each switching element. A dotted line in FIG. 2 is one example of such a delay. In particular, when a timing of transitioning from the valve opening maintaining section AR2 to a valve closing section AR3 is delayed, a valve closing timing of the solenoid valve 1 deviates from a request, which causes exhaust gas deterioration or fuel consumption deterioration of an engine device. This will be specifically described with reference to FIG. 3.

Figure 3:
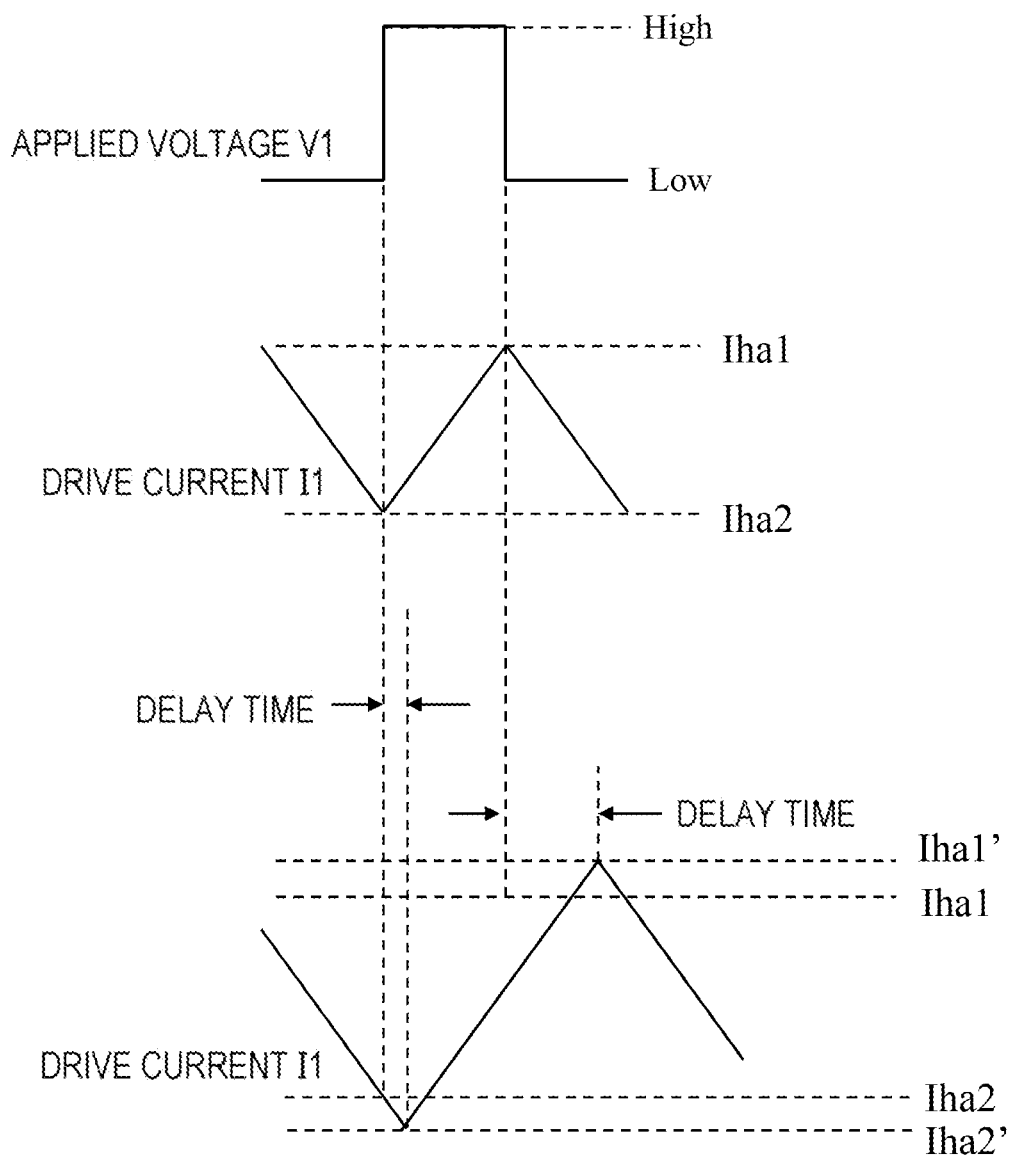
FIG. 3 is a diagram for describing an influence of a delay of a drive current I1.

FIG. 3 is a diagram for describing an influence of a delay of the drive current I1. Here, an example in the valve opening section is illustrated. An upper part of FIG. 3 is a waveform of the applied voltage V1 to the solenoid valve 1. A middle part of FIG. 3 is a current waveform in a case where the drive current I1 is not delayed with respect to the applied voltage V1. A lower part of FIG. 3 is a current waveform in a case where the drive current I1 is delayed with respect to the applied voltage V1.

In a case where the drive current I1 has a delay, even though the drive current I1 reaches the lower limit threshold Iha2 or the upper limit threshold Iha1, the drive current I1 may continue to change in the same direction, and resultantly exceed each threshold. In FIG. 3, an upper limit excess value Iha1' and a lower limit excess value Iha2' are exemplified respectively. Due to this drive current I1 exceeding the threshold, as illustrated by the dotted line in FIG. 2, a variation or a delay occurs in a period required for transitioning from the valve opening section AR1 to the valve opening maintaining section AR2 or a period required for transitioning from the valve opening maintaining section AR2 to the valve closing section AR3.

Figure 4:
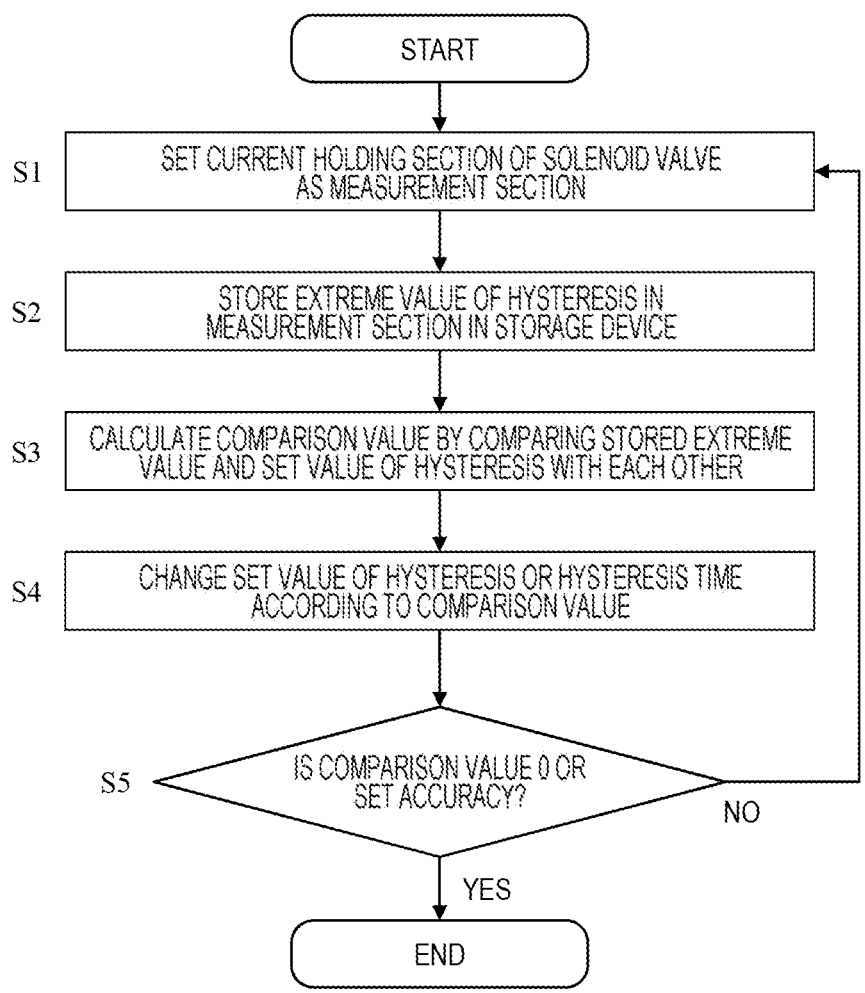
FIG. 4 is a flowchart illustrating a procedure in which the solenoid valve drive device 18 inhibits a hysteresis of the drive current I1 from exceeding a threshold.

FIG. 4 is a flowchart illustrating a procedure in which the solenoid valve drive device 18 inhibits a hysteresis of the drive current I1 from exceeding a threshold. The flowchart of FIG. 4 can be applied to both the valve opening section AR1 and the valve opening maintaining section AR2. Each step of FIG. 4 will be described below.

(FIG. 4: Step S1)

The control unit 16 sets a section in which the drive current I1 is maintained at a constant current level (valve opening section AR1 or valve opening maintaining section AR2 in FIG. 2) as a measurement section.

(FIG. 4: Step S2)

The control unit 16 detects an extreme value (for example, Iha1') of the hysteresis of the drive current I1 in the set measurement section by the current detection resistor 5. The extreme value measured in the present step may be an extreme value (for example, Iha1') on an upper limit threshold side, an extreme value (for example, Iha2') on a lower limit threshold side, or both of these extreme values. The control unit 16 stores the measured extreme value in the storage device 13 via a current monitor 19.

(FIG. 4: Step S3)

The control unit 16 calculates a comparison value (for example, difference value Iha1'−Iha1) by comparing the extreme value (for example, Iha1') stored in the storage device 13 in step S2 and the set value 14 (for example, Iha1) of the threshold corresponding to the extreme value with each other by the comparator 15. The comparison value in the present step is not necessarily a difference value as long as the extreme value and the set value can be compared with each other. For example, the comparison value may be a ratio (Iha1'/Iha1).

(FIG. 4: Step S4)

The control unit 16 changes the set value 14 of the extreme value of the hysteresis or a time interval between the extreme values of the hysteresis so that the subsequent drive current I1 falls within the threshold, according to the comparison value calculated in step S3. In a case of changing the set value 14, the set value 14 is corrected downward for an upper limit extreme value and the set value 14 is corrected upward for a lower limit extreme value. In a case of changing the time interval between the extreme values, the time interval is narrowed. The drive signal generation unit 12 outputs the subsequent drive signals T2 and T3 according to the changed value.

(FIG. 4: Step S5)

The control unit 16 repeatedly performs steps S1 to S4 until the comparison value reaches 0 or a value less than a predetermined comparison threshold. In a case where the comparison value has reached 0 or the value less than the predetermined comparison threshold, the present flowchart ends.

First Embodiment: Summary

The solenoid valve drive device 18 according to the first embodiment makes the extreme value of the subsequent hysteresis fall within the set value 14 by adjusting the set value 14 or the time interval between the extreme values, in a case where the extreme value of the hysteresis of the drive current I1 exceeds the set value 14 in a section where the drive current I1 is maintained in the vicinity of the constant current. As a result, a variation (pulsation width) of the drive current I1 is reduced particularly at the end of an energization period, and a variation of a valve closing delay time from the end of the energization period until the solenoid valve 1 is closed is reduced. Therefore, control accuracy of an injection end timing is improved. When control accuracy of an injection timing is improved, useless injection is reduced. Therefore, fuel consumption of the engine device can be improved and exhaust gas deterioration of the engine device can be suppressed.

Second Embodiment

An example in which the drive current I1 is maintained in the vicinity of a valve opening current in the valve opening section AR1 and the drive current I1 is maintained in the vicinity of a valve opening holding current in the valve opening maintaining section AR2 has been described in the first embodiment. In a second embodiment of the present invention, it will be described that a method similar to that of the first embodiment can be applied to the other patterns of change with time of a drive current I1. A configuration of a solenoid valve drive device 18 is similar to that of the first embodiment.

Figure 5A:
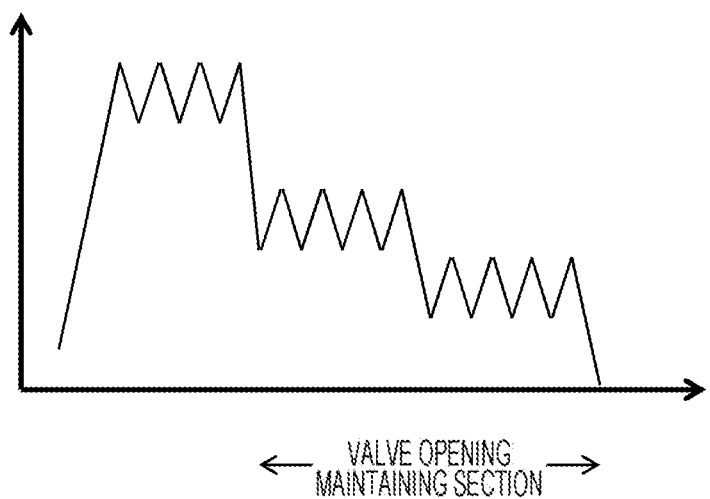
FIG. 5A is an example in which a valve opening maintaining section is configured in multiple stages.

FIG. 5A is an example in which a valve opening maintaining section is configured in multiple stages. In a case where the valve opening maintaining section is configured in the multiple stages as illustrated in FIG. 5A, a level of the drive current I1 immediately before transitioning to a valve closing section approaches a current level at a point in time of closing the solenoid valve, and the solenoid valve 1 can thus quickly transition to a closed state. That is, there is an advantage that a delay of a valve closing timing can be suppressed. Also in each stage in the valve opening maintaining section, similar to the first embodiment, an extreme value of a hysteresis of each valve opening maintaining current is held as a set value 14, and the set value 14 or a time interval between extreme values can be adjusted so that the drive current I1 falls within a set value range of the extreme values.

Figure 5B:
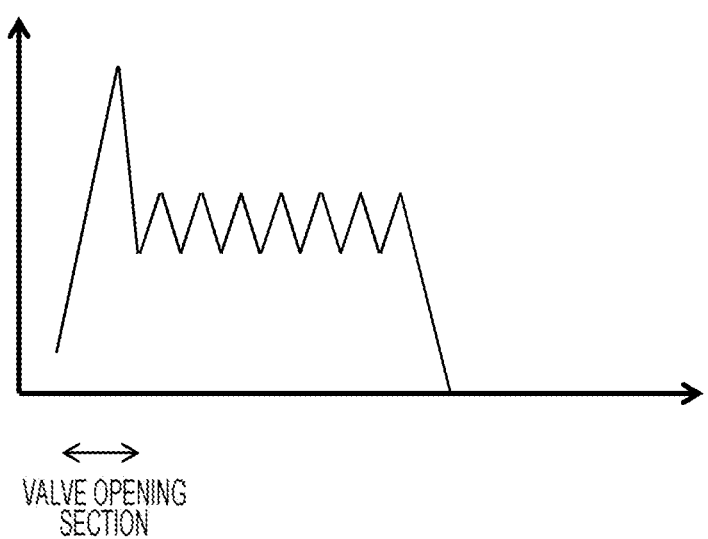
FIG. 5B is an example in which a drive current I1 is not held in the vicinity of a valve opening current in a valve opening section AR1.

FIG. 5B is an example in which a drive current I1 is not held in the vicinity of a valve opening current in a valve opening section AR1. In a case where it is not necessary to maintain the drive current I1 in the vicinity of the valve opening current in order to smoothly open the solenoid valve 1, the first switching element 2 may be turned off immediately when the drive current I1 reaches a peak as illustrated in FIG. 5B. Even in this case, the drive current I1 may exceed the set value 14 of the extreme value in the valve opening section. Therefore, the set value 14 may be adjusted so that the drive current I1 does not exceed the set value 14 in the next valve opening section.

Third Embodiment

FIG. 6 is a flowchart illustrating another procedure in which a solenoid valve drive device 18 inhibits a hysteresis of a drive current I1 from exceeding a threshold. A configuration of the solenoid valve drive device 18 is similar to those of the first and second embodiments. In FIG. 6, step S6 is performed instead of step S5. In step S6, a control unit 16 determines whether or not steps S1 to S4 have been performed a predetermined number of times. In a case where steps S1 to S4 have not been performed the predetermined number of times, the process returns to step S1 and similar processing is repeated. In a case where steps S1 to S4 have been performed a predetermined number of times, the present flowchart ends. The present flowchart has the significance of simplifying processing by limiting the number of times of the repetition within a predetermined number, for example, in a case of repeating changing the set value 14 or the time interval in a minimum unit in step S4.

In a case where the predetermined number of times in step S6 is one, the flowchart of FIG. 6 can be used in order to perform adjustment so that the drive current I1 falls within the range of the set value 14, for example, in a shipping inspection at the time of shipping the solenoid valve drive device 18. In this case, since it is not necessary to perform the flowchart of FIG. 6 after shipping the solenoid valve drive device 18, a storage device 13 can be configured by a one-time read only memory (ROM) (ROM in which data can be written only once). As a result, a cost of the storage device 13 can be suppressed.

Figure 7:
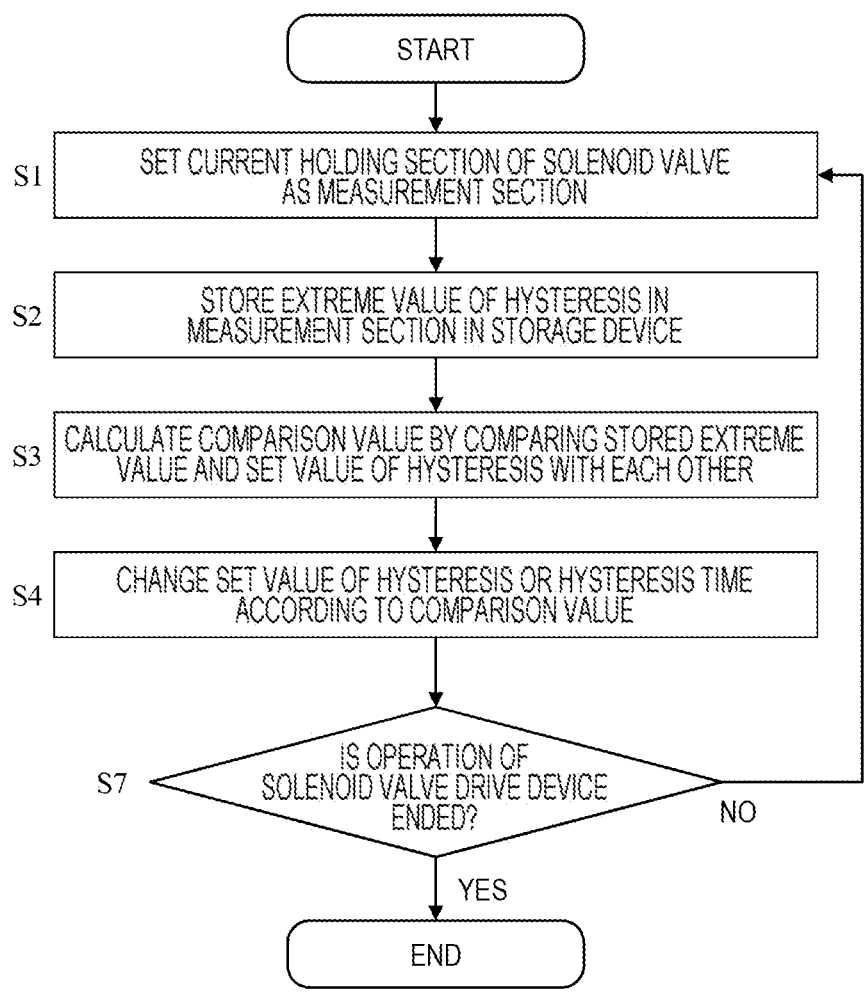
FIG. 7 is a flowchart illustrating another procedure in which a solenoid valve drive device 18 inhibits a hysteresis of the drive current I1 from exceeding a threshold.

FIG. 7 is a flowchart illustrating another procedure in which a solenoid valve drive device 18 inhibits a hysteresis of a drive current I1 from exceeding a threshold. A configuration of the solenoid valve drive device 18 is similar to those of the first and second embodiments. In FIG. 7, step S7 is performed instead of step S5. In step S7, a control unit 16 determines whether or not to end an operation of the solenoid valve drive device 18. In a case where the operation of the solenoid valve drive device 18 is not ended, the process returns to step S1 and similar processing is repeated. In a case where the operation of the solenoid valve drive device 18 is ended, the present flowchart ends. The present flowchart permanently repeats extreme value adjustment of the hysteresis of the drive current I1 while the solenoid valve drive device 18 is operating. As a result, for example, even though an ambient temperature of the solenoid valve drive device 18 changes, a hysteresis setting is updated, and the drive current I1 can thus continue to be controlled with high accuracy.

Fourth Embodiment

In a fourth embodiment of the present invention, a specific method of adjusting an extreme value of a hysteresis of a drive current I1 will be described in more detail. A configuration of a solenoid valve drive device 18 is similar to those of the first to third embodiments, and details of a method of adjusting an extreme value will thus be mainly described.

Figure 8:
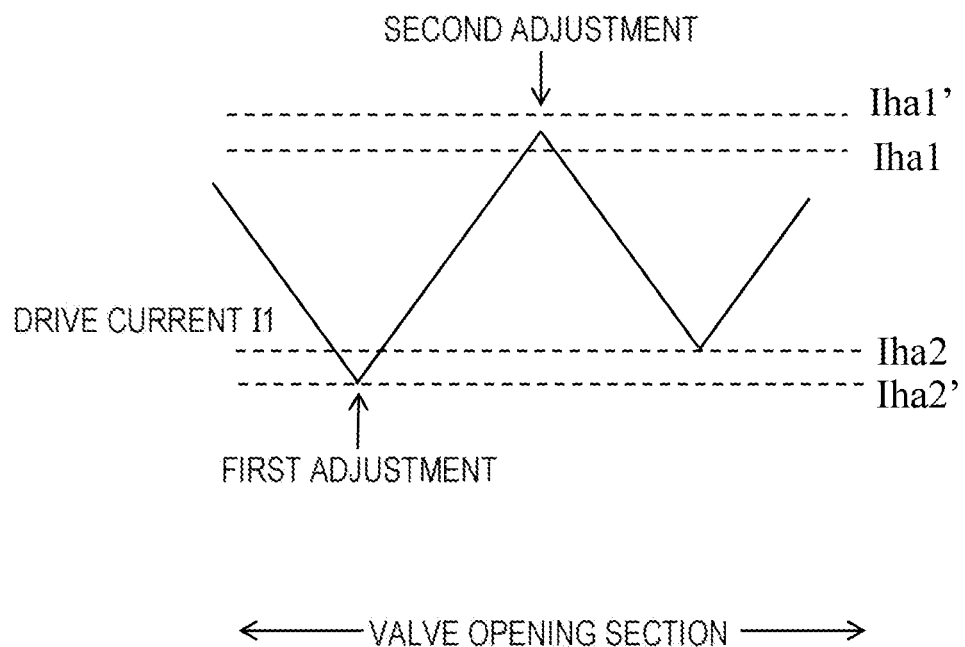
FIG. 8 is a diagram illustrating a specific example of a timing of adjusting an extreme value of a hysteresis of a drive current I1.

FIG. 8 is a diagram illustrating a specific example of a timing of adjusting an extreme value of a hysteresis of a drive current I1. In a case where it is found that the extreme value of the hysteresis of the drive current I1 exceeds a set value 14, a control unit 16 may immediately change the set value 14 or an extreme value interval. In FIG. 8, the set value 14 or the extreme value interval is changed before the drive current reaches the next extreme value in the same valve opening section AR1. As a result, the next extreme value is improved to some extent (an excess of the extreme value with respect to a threshold is reduced). In a case where the extreme value still exceeds the threshold in spite of adjustment, further adjustment may be performed. In FIG. 8, an example in which the drive current I1 falls within a threshold range by two-time adjustment is illustrated. Similar processing can be performed in a valve opening maintaining section AR2. A delay of the drive current I1 can be quickly corrected by the method illustrated in FIG. 8, and a possibility that a valve closing timing will deviate can be further reduced.

Figure 9:
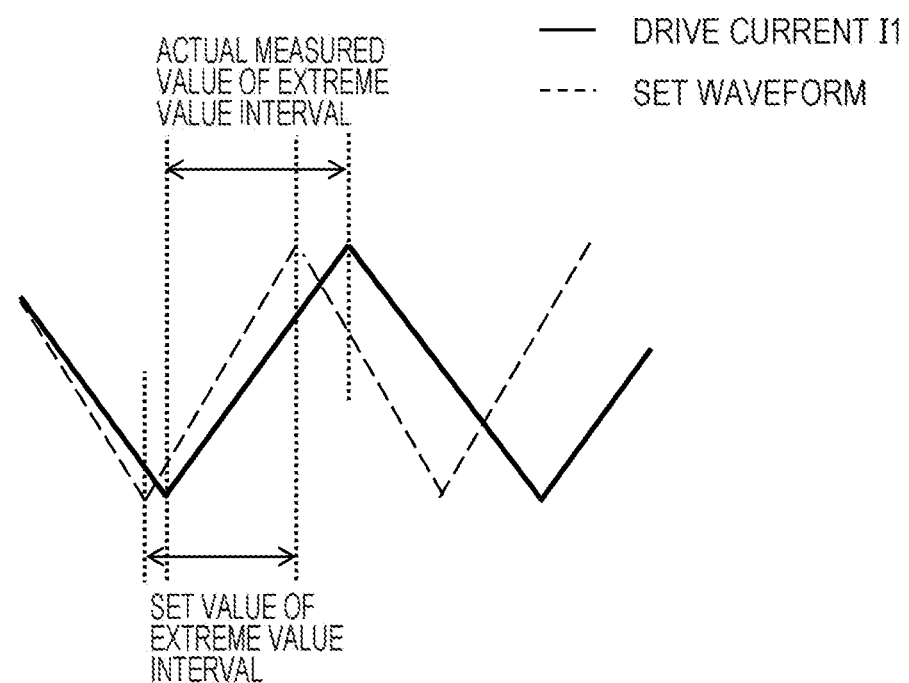
FIG. 9 is an example in which an inclination of the hysteresis of the drive current I1 deviates from an original setting.

FIG. 9 is an example in which an inclination of the hysteresis of the drive current I1 deviates from an original setting. A delay of the drive current I1 may appear as an inclination deviation of the hysteresis. The control unit 16 may detect the inclination deviation and adjust the inclination so that the inclination becomes an original inclination. Specifically, the set value of the time interval between the extreme values of the hysteresis can be stored in the storage device 13 in advance, the inclination of the hysteresis can be calculated based on an actual measured value of each of the time intervals between the extreme values of the hysteresis and an inclination of the set value can be calculated, and the inclination can be adjusted based on a difference between the actual measured value and the set value. For example, if the inclination is small, the drive current I1 is delayed, and the time interval between the extreme values is thus adjusted to be narrowed. A method of FIG. 9 can be said to be useful in a case where the delay of the drive current I1 does not appear as exceeding a threshold.

<Regarding Modifications of the Present Invention>

The present invention is not limited to the above embodiments, but includes various modifications. For example, the above embodiments have been described in detail in order to describe the present invention in an easy-to-understand manner, and are not necessarily limited to including all the components described. In addition, some of components of a certain embodiment can be replaced by components of another embodiment, and components of another embodiment can also be added to components of a certain embodiment. In addition, it is possible to add, delete, and replace other components with respect to some of the components of the respective embodiments.

In the above embodiments, each of the switching elements 2 to 4 may be a transistor such as a bipolar transistor, an insulated gate bipolar transistor (IGBT) or the like. The solenoid valve 1 is not limited to an injector, but may be, for example, a solenoid valve of a fuel pump that pressure-feeds fuel. The control unit 16 can be configured using an application specific integrated circuit (ASIC) or can be configured by combining a microcomputer and an ASIC with each other.

In the above embodiments, a maximum value or a minimum value of the hysteresis is treated as the extreme value, but an average value or an effective value of a current level over a certain time length near the extreme value, instead of the maximum value or the minimum value of the hysteresis, may be used as the extreme value. As a result, it is possible to suppress an excessive influence from a temporary event such as a momentary threshold excess.

In the above embodiments, it has been described to adjust the set value 14 or the extreme value interval of the hysteresis when the drive current I1 exceeds the threshold, but the phrase "exceeds the threshold" mentioned here means that an absolute value of the drive current I1 exceeds an absolute value of each threshold, as clear from the above description.

In the above embodiments, the lower limit threshold Iha2, the upper limit threshold Iha1, the lower limit threshold Ihb2, and the upper limit threshold Ihb1 correspond to an example of an "extreme value of a hysteresis" described in the claims. The valve opening section AR1 and the valve opening maintaining section AR2 can correspond to an example of a "peak hold period" described in the claims.

REFERENCE SIGNS LIST 1 solenoid valve
2 first switching element
3 second switching element
4 third switching element
5 current detection resistor
6 free wheeling diode
7 to 9 protection diode
10 battery
11 battery
15 comparator
16 control unit
17 system unit
18 solenoid valve drive device
19 current monitor

The invention claimed is:

1. A solenoid valve drive device wherein a hysteresis set value or a hysteresis time is set based on a first difference value between an extreme value of a hysteresis value of a solenoid valve current in a peak hold section of the solenoid valve current and a hysteresis set value, the solenoid valve drive device comprising:
a controller configured to:
output an opening/closing command to a first switching element for turning on/off a drive current supplied to the solenoid valve,
generate a hysteresis of the drive current by repeatedly turning on/off the first switching element in a first peak hold period after a current value of the drive current reaches a first current level, and
(i) set extreme values of the hysteresis such that the hysteresis of the drive current falls within a predetermined range from the first current level, or (ii) set a time interval between extreme values of the hysteresis such that the hysteresis of the drive current falls within a predetermined range from the first current level; and
a storage device configured to store set values of the extreme values of the hysteresis and a set value of the time interval between the extreme values of the hysteresis,
wherein the controller is further configured to:
calculate a first gradient of the hysteresis of the drive current using the extreme values of the hysteresis of the drive current and the time interval between the extreme values and calculate a second gradient of the hysteresis using the set values of the extreme values of the hysteresis and the set value of the time interval between the extreme values of the hysteresis, and
set the extreme values of the hysteresis or set the time interval between the extreme values of the hysteresis so that a second difference value between the first gradient and the second gradient falls within a predetermined gradient threshold in a case where the second difference value is not within the predetermined gradient threshold.

2. The solenoid valve drive device according to claim 1, wherein
the first switching element is configured to supply the drive current to the solenoid valve by supplying a battery voltage to the solenoid valve,
the controller is configured to:
maintain an opened state of the solenoid valve using the battery voltage by turning on/off the first switching element in the first peak hold period after the current value of the drive current reaches a second current level higher than the first current level, and
make a timing at which the solenoid valve transitions from the opened state to a closed state fall within an allowable time after instructing the first switching element to be turned off by making the hysteresis fall within a predetermined range from the first current level in the first peak hold period.

3. The solenoid valve drive device according to claim 1, wherein
the controller is configured to output an opening/closing command to a second switching element for turning on/off a drive current supplied to the solenoid valve,
the second switching element is configured to open the solenoid valve by supplying a boosted voltage obtained by boosting a battery voltage to the solenoid valve to supply the drive current having a second current level higher than the first current level to the solenoid valve, and
the controller is configured to drive and control the second switching element so that an extreme value of the drive current falls within a predetermined range from the second current level.

4. The solenoid valve drive device according to claim 3, wherein
the controller is configured to:
generate a hysteresis of the drive current by repeatedly turning on/off the second switching element in a second peak hold period after the current value of the drive current reaches the second current level, and
set extreme values of the hysteresis or set a time interval between the extreme values of the hysteresis so that the hysteresis of the drive current falls within a predetermined range from the second current level.

5. The solenoid valve drive device according to claim 3, wherein
the controller is configured to:
turn off the second switching element and acquire a measured value of the extreme value of the drive current, when the current value of the drive current reaches the second current level, and
drive and control the second switching element according to the measured value of the extreme value of the drive current so that the extreme value of the drive current falls within a predetermined range from the second current level, when opening the solenoid valve by turning on the second switching element again after turning off the second switching element.

6. The solenoid valve drive device according to claim 1, wherein
the controller is configured to:
acquire the first difference value between the extreme value of the hysteresis and a set value of the extreme value of the hysteresis by acquiring a difference between a measured value of the drive current and a set value of the drive current, and
repeat the acquisition of the first difference value and repeat the setting of the extreme values of the hysteresis or the setting of the time interval between the extreme values of the hysteresis, until the first difference value becomes equal to or less than a predetermined threshold.

7. The solenoid valve drive device according to claim 1, wherein
the controller is configured to:
acquire the first difference value between the extreme value of the hysteresis and a set value of the extreme value of the hysteresis by acquiring a difference between a measured value of the drive current and a set value of the drive current, and
repeat the acquisition of the first difference value and repeat the setting of the extreme values of the hysteresis or the setting of the time interval between the extreme values of the hysteresis, while the solenoid valve drive device is activated.

8. The solenoid valve drive device according to claim 1, wherein
the controller is configured to:
acquire the first difference value between the extreme value of the hysteresis and a set value of the extreme value of the hysteresis by acquiring a difference between a measured value of the drive current and a set value of the drive current, and
repeat the acquisition of the first difference value a predetermined number of times and repeat the setting of the extreme values of the hysteresis or the setting of the time interval between the extreme values of the hysteresis a predetermined number of times.

9. The solenoid valve drive device according to claim 1, wherein
the controller is configured to:
acquire a first extreme value in the hysteresis of the drive current, and
set the extreme values of the hysteresis or set the time interval between the extreme values of the hysteresis so that a second extreme value in the same hysteresis of the drive current falls within the predetermined range, in a case where the first extreme value does not fall within the predetermined range.

10. The solenoid valve drive device according to claim 1, wherein the controller is configured to calculate an average value or an execution value of the extreme values of the hysteresis from a first time to a second time, and calculate a difference between the calculated value and the hysteresis set value as the first difference value.

* * * * *